United States Patent [19]

Brodin

[11] Patent Number: 4,590,831
[45] Date of Patent: May 27, 1986

[54] HYDRAULIC STROKE CONTROL FOR RADIAL ARM SAWS

[76] Inventor: Ralph Brodin, Box 155, Girdwood, Ak. 99587

[21] Appl. No.: 690,612

[22] Filed: Jan. 11, 1985

[51] Int. Cl.$^4$ .............................................. B27B 5/20
[52] U.S. Cl. ...................................... 83/56; 83/471.3; 83/485; 83/756
[58] Field of Search ............... 83/471.3, 471.2, 485, 83/486, 486.1, 489, 487, 488, 472, 473, 56, 754, 755, 756, 757

[56] References Cited

U.S. PATENT DOCUMENTS

| | | | |
|---|---|---|---|
| 2,172,274 | 9/1939 | Crouch | 83/488 X |
| 2,773,524 | 12/1956 | Schutz et al. | 83/486.1 |
| 2,873,508 | 2/1959 | Candler | 83/488 |
| 3,090,269 | 5/1963 | Porter | 83/473 |
| 3,603,360 | 9/1971 | Botefuhr | 83/486.1 X |
| 3,789,279 | 1/1974 | Dempsey et al. | 83/488 X |
| 3,910,142 | 10/1975 | Jureit et al. | 83/471.3 X |
| 4,131,143 | 12/1978 | Mayo | 83/471.3 X |

Primary Examiner—Frank T. Yost
Attorney, Agent, or Firm—Milton S. Gerstein

[57] ABSTRACT

In a radial arm saw, there is provided a continuously adjustable restraining device for controlling the speed of cut of the saw through work pieces positioned on the work table. The adjustable device has a hydraulic cylinder which is connected at one port to a first connection line, and at the other port to a second connection line. Each connection line is connected in turn to a valve which controls the flow of fluid from one connection line to the other. The valve has a pivotal lever for continuously adjusting the flow rate of fluid therethrough, which fluid is forced out of one port of the cylinder upon movement of the saw by the user of the saw, through the valve, and into the other port of the cylinder at a control rate determined by the pivotal rotation of the pivotal lever. Thus, the rate of flow of the fluid between the cylinder ports is variable and controllable, to thereby provide a desired counter-force to the movement of the saw as its progresses through its cut of the work piece. The hand saw is connected to the piston rod of the cylinder at a remote end of the piston rod. Thus, the thrust of the power hand saw toward the user during cutting can be controlled, and stalling of the motor of the saw can be obviated by slowing down the speed of cut. In the preferred embodiment, the valve is mounted on the handle of saw motor, for controlling the speed of cut with the same hand that is moving the saw.

19 Claims, 5 Drawing Figures 4,590,831

HYDRAULIC STROKE CONTROL FOR RADIAL ARM SAWS

BACKGROUND OF THE INVENTION

The present invention is directed to a stroke-control for a radial arm saw. In a radial arm saw, the rotary saw is moved above the plane containing the work-support surface by the user of the saw, by manually pushing and pulling the saw with a hand gripping a handle of the saw unit. During the cut of a workpiece, it often occurs that the blade tends to draw itself into the workpiece at a rate faster than the speed of the saw can allow, which often leads to the stalling of the motor rotating the saw blade, or often causes the motor and saw blade to lurch toward the user of the saw. This is a safety hazard, as well as a source of improper and undesired cutting of the workpiece. This usually presents itself when the workpiece is cut by the rotary saw such that the direction of rotation of the saw blade is that which would tend to draw the workpiece toward it. With currently available and used radial arm saws, the only means by which the rate of progress of the saw through the workpiece may be controlled is the actual restraining force applied by the user himself, when he pulls back on the saw via his hand gripping the handle of the unit, as he moves the unit across the workpiece. More often than not, the forces capable of being applied manually by the user of the device are not adequate to control the cut without the attendant improper cutting or potential hazard being present. It is the purpose of the present invention to provide a manually-controllable hydraulic unit that allows a restraining force to be applied against the forward movement of the saw unit when cutting a workpiece, which restraining force is continuously variable to suit the requirements of the user of the device, the particular type and size of workpiece being cut, and the rate of speed of the cut through the workpiece, so that at the slightest hint of hazard or improper cutting of the workpiece, the user of the unit may readily and quickly adjust the restraining force to adapt to the conditions extant at any given moment during the cut through the workpiece, but still allow easy and fast return of the saw unit to its starting, pre-cutting position for subsequent cutting of another workpiece.

SUMMARY OF THE INVENTION

It is, therefore, the primary object of the present invention to provide in a radial arm saw a continuously adjustable power saw restraining device that opposes the movement of the power saw as it cuts through a work piece, so that speed of such cut may be controlled at the proper rate for the type and size of work piece.

It is another object of the present invention to provide such a restraining device that allows for control thereof with the very same hand that moves the power hand saw through its cut of the work piece.

It is still another object of the present invention to provide a restraining device for the power hand saw of the radial arm saw such that the return stroke after cutting through the work piece may be achieved with little or no restraining force at all, but still allow such restraining force to be applied if it is so desired.

It is yet another object of the present invention to provide such a restraining device for the radial arm saw and still allow for all movements of the saw as occurs in conventional radial arm saws, so that the saw may make angular cuts, and the like.

Toward these ends, the improved radial arm saw of the present invention has, in the preferred embodiment, a hydraulic cylinder in which reciprocates a conventional piston with protruding piston rod. The cylinder has a first port at one end, and a second port at the other end. A first connection line is connected at the first port of the cylinder, while a second connection line is connected at the second port of the cylinder. Each connection line is, in turn, connected at their other ends to a valve for controlling the flow of fluid between the valve-attached ends of the connection lines.

The end of the piston rod is secured to a tie or connecting rod, which connecting rod is also secured at its other end to the housing of the power hand saw, so that as the power hand saw moves through a work piece, as the user forces such movement to cut the work piece, such movement must overcome the force exerted thereon by the movement of the piston rod within the cylinder. By controlling the flow of fluid through the valve, and thus through the connection lines, the movement of the piston in the cylinder is made either easier or harder. Thus, the movement of the power hand saw itself is made either easier or harder, due to the connection of the hand saw with the piston rod of the piston of the cylinder.

In the preferred embodiment of the invention, the valve is a manually-controlled valve having a pivotal lever which controls the movement of the valve stem, to thereby increase or decrease the flow of fluid between the ports of the valve to which are connected the two connection lines. The pivotal lever is spring-biassed into a normally-closed position in which flow is stopped through the valve, so as to prevent any movement of the power hand saw. Rotation of the lever allows flow of the fluid, to, thereby, permit movement of the saw in either of its two directions. The device of the present invention allows a counter-force to be applied to the saw whether the saw is moved in the forward cutting direction, or reverse re-start direction. To aid in easy return of the saw back to its cutting stroke, the lever is pivoted to its maximum position, to thus allow complete and unimpaired flow of the fluid through the valve.

Though in the preferred embodiment of the invention a pivotal lever-type, manually-controlled valve is disclosed, other types may be employed with the operation of the power hand saw. The device of the present invention also has utilization outside of the radial arm saw area, as well, and is capable of use in any environment where control of a translatable element is required or desired in a continuous and adjustable manner. Further, in the preferred embodiment, the valve is mounted to the handle of the power hand saw so that one hand may move the saw and control its speed of cut.

BRIEF DESCRIPTION OF THE DRAWING

The invention will be more readily understood with reference to the accompanying drawing, wherein.

DETAILED DESCRIPTION OF THE INVENTION

Figure 1:
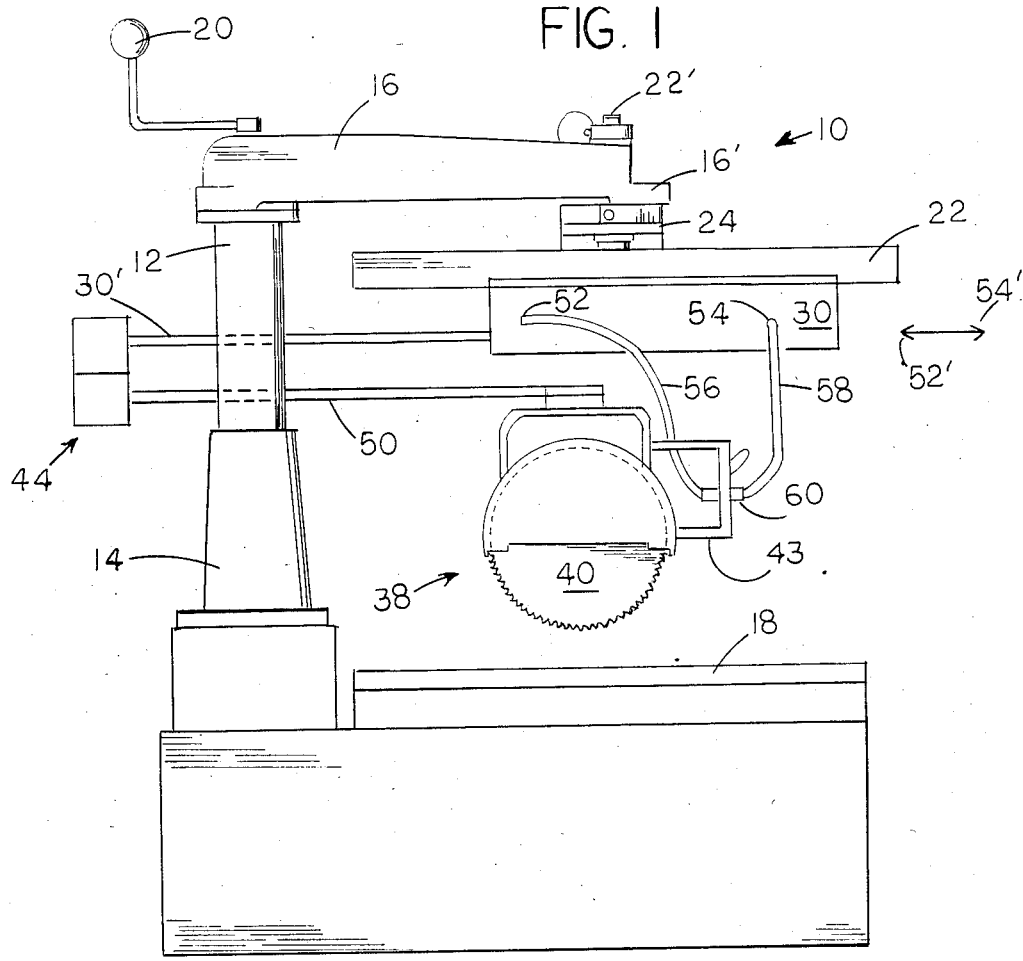
FIG. 1 is a side elevational view of a radial arm saw incorporating therein the novel hydraulic stroke control unit of the present invention for controlling the movement of the saw.
Figure 2:
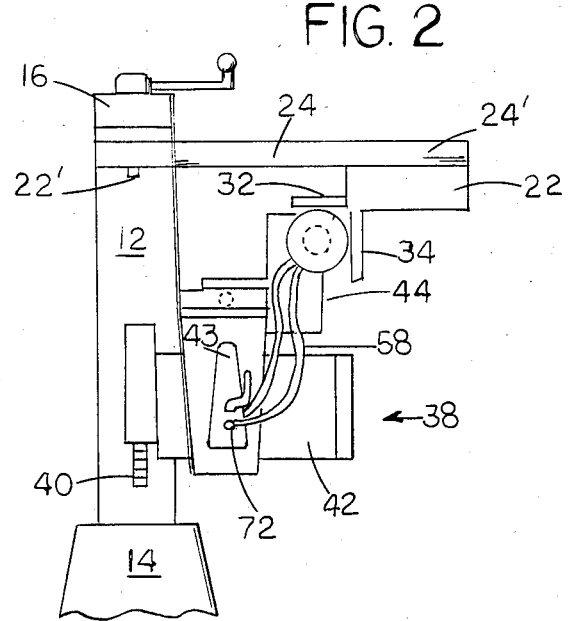
FIG. 2 is a front elevational view of the radial arm saw of FIG. 1.

Referring now to the drawing in greater detail, there is shown in FIG. 1 a radial arm saw unit 10 incorporating the novel hydraulic stroke control mechanism of the present invention. The radial arm saw unit 10 has a vertical post 12, a vertical column 14, and a radial arm 16 that is positionable in different locations relative to a table top 18 by a crank 20, all of which are conventional and well-known in the art. At the remote end of the radial arm 16, there is provided a track assembly 22 that is pivotally connected to the remote end 16' of the radial arm via plate 24 and pivot 22' in the conventional manner. The angular adjustability via pivot 22' allows for selected angular cuts of a workpiece supported on the table top surface 18. As shown in FIG. 2, the plate 24 mounts the assembly 22 laterally of the post 12, the plate 24 mounting the assembly 22 at its remote end 24', to space the assembly 22 to allow for proper positioning of the saw assembly. The assembly 22 mounts a hydraulic cylinder 30 at the inner portion of the assembly 22, so that the cylinder preferably lies closer to the post 12 than the assembly 22. Mounting brackets 32 and 34 are used to mount the hydraulic cylinder to the assembly 22, though any other conventional fastening means may be used, such fastening not constituting the novelty of the present invention. This hydraulic cylinder 30 serves to provide a restraining force to the movement of the rotary saw unit 38, in the manner to be described below.

Figure 3:
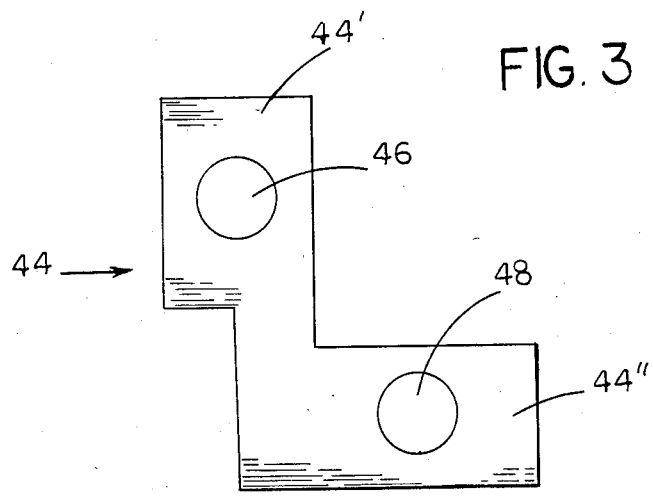
FIG. 3 is a detail view showing the mounting block connecting the end of the piston rod of the hydraulic cylinder to the end of the connecting rod, so that the piston rod and rotary saw assembly move in unison.
Figure 4:
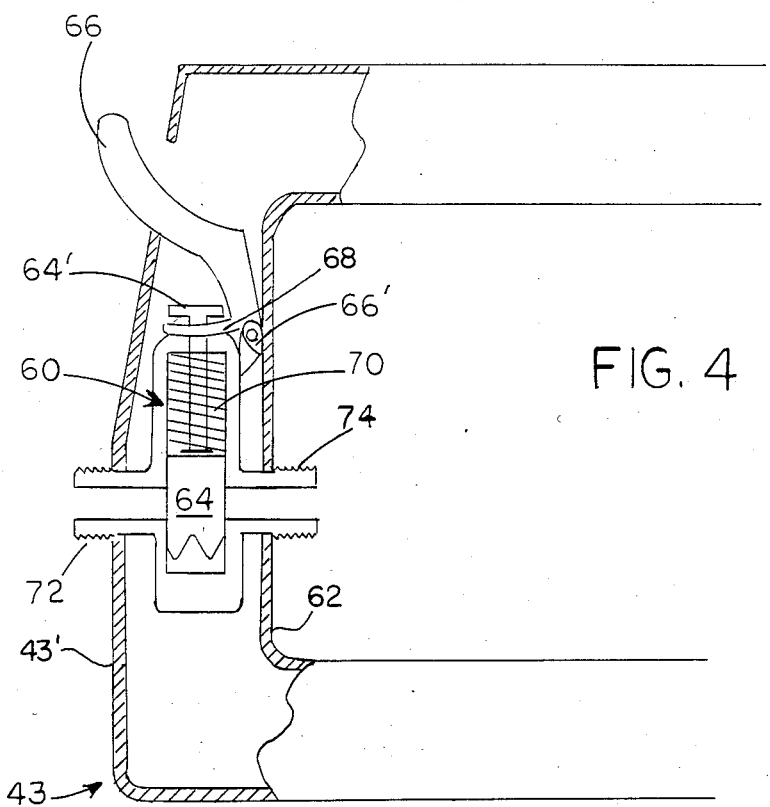
FIG. 4 is a side plan view of the handle of the rotary saw assembly in which is mounted the control valve of the present invention for controlling the restraining force that provides a counter-force to the movement of the rotary saw assembly.

The rotary unit 38 has a conventional saw blade 40 driven by a motor 42, which motor has a handle portion 43 for gripping by the hand of the user of the device in order to reciprocate the saw unit back and forth to cut a workpiece supported on table top 18. FIG. 4 shows this handle 43 in detail. The saw unit 38 is mounted for reciprocation by the piston 30' of the hydraulic cylinder 30. This is achieved via a mounting block 44, best viewed in FIG. 3. This block 44 is typically L-shaped having an upper connecting portion 44' with threaded opening 46 for mounting the distal end 30' of the piston 30. The block 44 also has a lower connecting portion 44" having a threaded opening 48 for mounting the distal end of a connecting rod 50, which connecting rod 50 is fastened at its other end to the casing of the motor 42. Thus, it can be seen that the connecting rod 50 and the piston rod 30' are generally parallel along the lengths thereof, with the connecting rod 50 being mounted somewhat generally lower in elevation relative to the table top 18 than the piston rod 30'. However, it is to be understood that this relationship is given only by way of example, and it is within the realm and purview of the present invention to position the two rods in the same imaginary planes. It can, therefore, be seen that when the saw assembly 38 is reciprocated manually by the user of the device, so as to cut a workpiece, such movement of the saw unit is concurrently delivered to the piston rod 30' via the connecting rod 50, so that the rods 30' and 50 move in tandem.

The hydraulic cylinder 30 is a conventional cylinder in which hydraulic fluid is the operating medium by which the cylinder functions. In the double-acting type of hydraulic cylinder, shown in FIGS. 1 and 2, there are provided two outlet ports 52 and 54 for the fluid medium. In the present invention, there are connected to the these outlet ports 52 and 54 a pair of hose lines 56 and 58 through which the hydraulic fluid is forced during the movement of the saw unit, which movement causes the fluid to flow through the hose lines by the concurrent movement of the piston rod 30'. For every stroke of the piston rod 30', the operating fluid is forced out of one of the outlet ports 52 and 54, and into the other of the outlet ports. For example, in the position shown in FIG. 1, upon movement of the piston rod 30' in the direction of arrow 54', the fluid is forced through the port 54, while upon movement of the piston rod 30' in the direction of arrow 52', the fluid is forced through the port 52 and through the hose line 56. The arrows 52' and 54' also indicate the movement of the saw unit as it is reciprocated manually by the user of the device 10. When the fluid is forced out of the port 52, it travels through the hose line 56, through the valve 60, to be described below in greater detail, which valve is mounted in the handle 43 of the motor casing, and through the line 58 and into the other end of the cylinder via port 54. The rate at which such movement of the fluid through the lines and valve is controlled determines the restraining force to the reciprocation of the saw unit 38. For example, when the saw unit is moved in the direction of arrow 54' in order cut a workpiece, the degree to which such movement of the saw unit is opposed by the stroke control cylinder 30 is inversely proportional to the rate at which the fluid is allowed to flow through the valve 60. If the valve 60 is fully open, offering no restriction to the flow of fluid therethrough, then there is little restraint to the pull of the saw through the workpiece, other than than that naturally occurring by the workpiece itself. However, if the valve is partially closed to restrict the flow of fluid therethrough, then the fluid in the cylinder 30 provides opposition to the movement of the saw through the workpiece itself. The more closed the valve is, the more will be the opposition to the movement of the saw through the workpiece, with the limit of no movement being reached when the valve is completely closed. Thus, there is achieved a continuously variable stroke control mechanism that allows for any desired counterforce to the movement of the saw through the workpiece, so as to prevent lurching of the motor and/or stalling thereof, as described above, and which, thus, eliminates the hitherto present hazards associated with the cutting operations of a radial arm saw.

Figure 5:
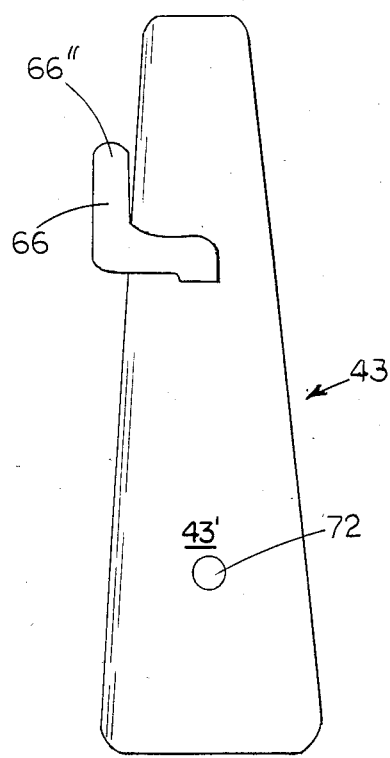
FIG. 5 is a front view of the handle of FIG. 4 with the control valve of the present invention.

In order to facilitate the operation of the hydraulic stroke control unit of the present invention, the valve 60, as mentioned above, is mounted within the handle 44 of the motor casing itself. This allows for the very same hand that is moving the saw assembly to also control the operation of the cylindrical fluid flow, to adjust the rate of cut to the conditions prevailing for any workpiece. FIG. 4 shows this valve 60 in greater detail. The valve 60 is mounted in the interior of the front portion 43' of the handle 43, and includes a main casing 62 in which reciprocates the valve stem 64. The valve is a normally-closed valve that is opened upon retraction of the stem 64 by a pivotal lever arm 66 pivotally connected to the casing 62 of the valve, as shown at 66' in FIG. 4. The lever 66, when pivoted in the clockwise direction when viewing FIG. 4, causes its fork element 68 to pivot upwardly, thereby raising the valve stem via its head portion 64', in a manner evident in FIG. 4. Such lifting of the valve stem is opposed by a spring 70, which returns the valve to its normally-closed position upon release of the lever 66. The valve has a pair of linearly-aligned ports 72 and 74, which threadingly, or otherwise, mount thereto the ends of the hose lines 56 and 58 remote from the cylinder 22, so that the flow of fluid between the ports 52 and 54 of the cylinder can be controlled in the manner above-described. As can be seen in FIG. 5, the lever arm 66 projects outwardly of the front portion 43' of the handle 43, such that its top 66" is readily accessible by a thumb of the hand of the user of the device as he grips the handle 43 for moving the saw assembly and motor. The lever 66 is preferably contoured such that it bends laterally beyond the side surface of the front portion 43', which allows for a greater degree of control of the hydraulic stroke control unit, while at the same time allowing for easier handling by the thumb of the hand as it grips the handle. In can, therefore, be seen that in operation, when cutting through a workpiece, the rate of cut is controllable by the simple depression of the lever arm 66. The greater such depression, the easier it is to cut through the workpiece, while the less the lever is depressed, the greater the counter-force to the cutting with a greater degree of control of the cut.

While the hydraulic cylinder 30 has been shown to be a double-acting cylinder, it is also possible to use a balanced cylinder as well, with the same general construction shown being used. It is also to be generally appreciated that the hydraulic stroke control of the present invention may be used in many areas where the speed of movement of an element is desired to be controlled by the application of a counter-force to such movement, such control being realized by the better control of the inertia of the moving element. Thus, the stroke control unit of the present invention also has use and relevance to other devices and environments where the speed of a moving element needs, or is desired, to be controlled in a continuous and variable manner. It is also to be noted that, though the preferred form of the invention has disclosed speed controlling one plane, it is to be understood that such speed control may be adapted to control speed in three dimensional space along the x-y-z axes, so that curved, spatial paths may be controlled. In this modification, a cylinder 30 is mounted in gyroscopic fashion, by any well-known means. However, instead of using a gyroscopic mounting for one cylinder, a second cylinder similar to cylinder 30 may be used, which second cylinder is mounted to the first cylinder 30 for controlling the vertical, z-axis movement of the element. In this case, the second cylinder would be fixedly mounted to the first cylinder 30 for pivotal movement therewith, with its piston rod being fixedly connected to another mounting block similar to block 44. A second connecting rod similar to rod 50 would also be provided for vertical extension, with one end of the vertical connecting rod being affixed to the casing of the motor 42, with its other end being affixed to the other portion of the second mounting block. A second control valve similar to valve 60 would also be provided, which second control valve would operate just as the valve 60. This second valve would preferably be mounted in a different portion of the handle 43, so that the other hand of the user of the device would operate it for lifting and lowering of the moving element whose speed is to be controlled. In this case, automatic horizontal movement of the reciprocating element is guaranteed by simply not depressing the lever associated with the second valve, which freezes the movement of the element in the x-y plane.

While a specific embodiment of the invention has been shown and described, it is to be understood that numerous changes and modifications may be made in addition to those above-enumerated without departing from the scope and spirit of the invention as set out in the appended claims. If a balanced cylinder were used instead of the double-acting cylinder shown in the drawing, which balanced cylinder is conventional and well-known, then the cylindrical housing would be allowed to reciprocate while the two piston rods of the balanced cylinder would be fixed in place. In this embodiment using a balanced cylinder, the cylindrical housing is fixedly connected to the motor casing for concurrent movement therewith, with the two oppositely extending pistons rods affixed to the assembly 22.

What is claimed is:

1. In a radial arm saw apparatus having a support surface upon which work to be cut is placed, means for supporting the support surface above the floor, a radial arm above the support surface, and a power saw means connected to an end of the radial arm, the improvement comprising:

means connecting said power saw means to said radial arm, said means for connecting comprising continuously adjustable restraining means, and means for mounting said power means for movement along the length of the radial arm against the force provided by said adjustable restraining means, whereby the speed of cut through a work piece supported on the support surface may be controlled and varied as desired.

2. The improvement according to claim 1, wherein said adjustable restraining means comprises a piston-cylinder arrangement, and control means for controlling the flow of the operating fluid of said piston-cylinder arrangement into and out of the cylinder, said control means being operatively connected with the ends of said cylinder.

3. The improvement according to claim 2, wherein said control means comprises valve means having continuously adjustable flow means for controlling the rate of flow of the operating fluid of said cylinder into and out the ports of said cylinder.

4. The improvement according to claim 3, wherein said power saw means comprises a handle for gripping by the user of the saw for moving the power saw means along the length of said radial arm; and said control means further comprises a first connecting line having a first end connected to a first port of said cylinder, and a second end connected to said valve means, and a second connecting line having a first end connected a second port of said cylinder and a second end connected to said valve opposite to said second end of said first connecting line; said valve means comprising means for continuously adjusting the flow of the operating fluid therethrough between said second ends of said first and second connecting lines.

5. The improvement according to claim 4, wherein said means for continuously adjusting the flow comprises a pivotal lever pivotally connected to the handle portion of said power saw means so that when the power saw means is translated along the radial arm by holding the handle thereof, the pivotal lever may be controlled at the same time to adjust the speed of the cutting stroke.

6. The improvement according to claim 5, wherein said power saw means comprises a motor and a rotary saw, and means for pivotally mounting said motor means and saw for pivotal rotation in a plane parallel to the horizontal extension of said radial arm.

7. The improvement according to claim 2, wherein said means connecting said power saw means to said radial arm further comprises means connected to the free end of said piston of said piston-cylinder arrangement for movement therewith comprising a block; and a rod having one end connected to said power saw means and another end connected to said block at a location thereof spaced from the portion of said block connected to said piston, so that when said power saw means is moved along said radial arm, said piston moves therewith to provide a counter-force to the movement which is controllable by said adjustable restraining means.

8. The improvement according to claim 7, wherein said control means comprises a valve means, a first connecting hose having a first end connected one port of said cylinder, and a second end connected to one port of said valve means, and a second connecting hose having a first end connected to another port of said cylinder, and a second end connected to another port of said valve means; said valve means being mounted on said power saw means for movement therewith along said radial arm, whereby said valve means controls the flow of operating fluid between the ports of said cylinder through said first connecting hose and said second connecting hose.

9. The improvement according to claim 8, wherein said valve means comprises a pivotal control lever for moving the control shank of said valve means, said valve means having spring means for urging said shank of said valve means into a normally-closed position shutting off flow through said valve means; said pivotal lever having an offset portion thereof such that said offset portion lies spaced from the shank of said valve means and projects through the handle of said power saw means so that said offset portion lies directly adjacent a side edge surface of the handle of said power saw means for gripping by the thumb of the user of the apparatus.

10. A device for continuously adjusting the restraining force exerted on a moving element in a first direction and a second direction opposite to said first direction, said device comprising:
a cylinder having a reciprocating piston mounted therein, said piston having a piston rod having a portion thereof projecting outside an end of said cylinder; said cylinder having a first port located at one end portion of said cylinder, and a second port located at the other end portion of said cylinder;
a first fluid connection line having a first end connected to said first port, and a second end remote from said first end;
a second fluid connection line having a first end connected to said second port, and a second end remote from said first end;
valve means interposed between said second ends of said first and said second connection lines, said second end of said first connection line being fluidly connected to one port of said valve means, and said second end of said second connection line being fluidly connected to another port of said valve means, said valve means controlling the flow between said ports and, thus, the flow between said second ends of said connection lines as the fluid flows directly from one of said second ends to the other of said second ends;
a power hand saw having a motor and a rotary saw blade powered by said motor;
connecting means having one end thereof connected to said power hand saw, and another end thereof connected to the movable portion of the piston-cylinder arrangement for movement therewith;
whereby the speed of the cutting stroke of said power hand saw is controlled by adjusting the restraining force of said device by said valve means which restraining force opposes the movement of said power hand saw in at least one of its directions of movement.

11. The device according to claim 10, wherein said valve means is a manually-controllable valve having a pivotal lever urged into a normally-closed position, said valve further having spring means for biassing said pivotal lever to said normally-closed position; said lever being rotatable by a thumb, finger, or hand of the user of the device to control the rate of flow of the fluid between said ports and said second ends of said connections lines, so as to vary the restraining force exerted on the moving element.

12. The device according to claim 11, wherein said power
hand saw comprises a handle portion for gripping thereof by the user of the hand saw; said valve means being mounted to said handle portion with said pivotal lever extending outward thereof for ready access by the hand of the user, so that as the power hand saw is moved to cut work pieces, the speed of cutting may be controlled by the very same hand pushing or pulling the power hand saw.

13. The device according to claim 11, further comprising a supporting frame for said cylinder and for said power hand saw, so that said power hand saw may cut work pieces positioned therebelow.

14. The device according to claim 13, wherein said supporting frame is a radial arm saw frame comprising a radial arm, and track means on said radial arm operatively mounting said cylinder for adjusting the angle of cut of said power saw.

15. A method of continuously adjusting a restraining force exerted on a translating element so that the restraining force may be adjusted to desired settings as the element translates along its path of movement, said method comprising:
(a) moving the element along a path to perform a desired function;
(b) restraining the movement of the element during such movement along the path by providing a counterforce, said step of restraining comprising continuously adjusting the counter-force exerted on the moving element to oppose movement thereof;
(c) returning the translating element in a direction towards its original starting position;
(d) exerting a counter-force on the translating element during said step (c);
(e) controlling the counter-force exerted on the translating element during its return movement of said step (c) so that such return counter-force is controlled to determine the speed and ease of return of the translating element, said step of controlling comprising continuously controlling the counter-force during the return of the element.

16. The method according to claim 15, wherein said step (a) comprises moving a rotary saw through a workpiece positioned on a table top surface and cutting the workpiece, said step (b) comprising controlling the speed of cut of the rotary saw through the workpiece.

17. The method according to claim 16, wherein said step (c) comprises returning the rotary saw to its pre-cut starting position to reset the saw for subsequent cutting of a workpiece.

18. The method according to claim 17, wherein said step (e) comprises releasing the counter-force applied to the rotary saw to allow return of the saw as fast and as easy as possible.

19. The method according to claim 15, wherein said step (b) and said step (e) each comprises controlling a valve to control the flow of an operating fluid medium between the two ports of a hydraulic cylinder.

* * * * *